UNITED STATES PATENT OFFICE.

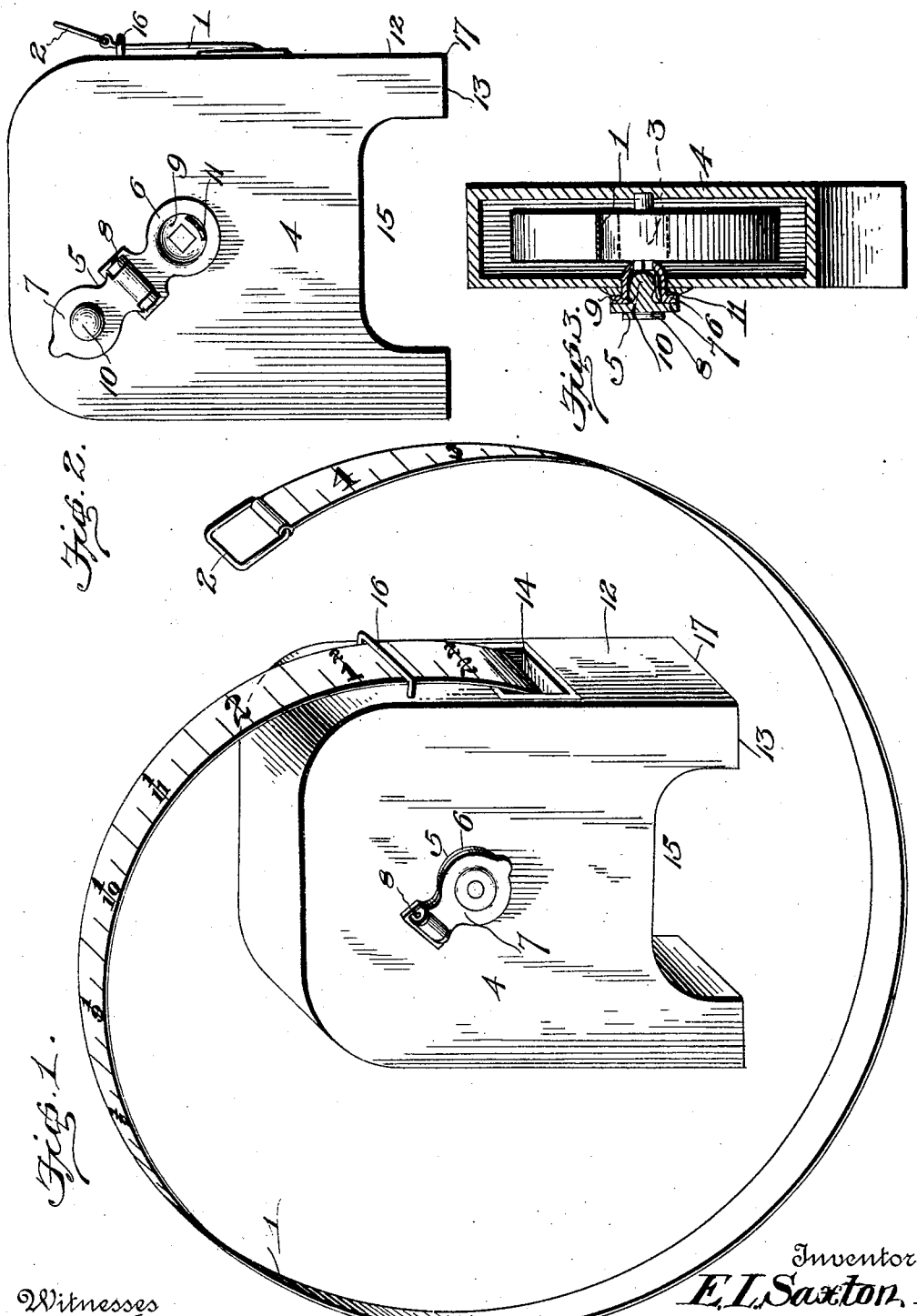

EDMUND L. SAXTON, OF LANSING, MICHIGAN.

MEASURING-TAPE.

REISSUED

No. 809,139.　　Specification of Letters Patent.　　Patented Jan. 2, 1906.

Application filed June 29, 1905. Serial No. 267,675.

*To all whom it may concern:*

Be it known that I, EDMUND L. SAXTON, a citizen of the United States, residing at Lansing, in the county of Ingham and State of Michigan, have invented certain new and useful Improvements in Measuring-Tapes; and I do declare the following to be a full, clear, and exact description of the invention, such as will enable others skilled in the art to which it appertains to make and use the same.

My invention relates to improvements in measuring-tapes and cases therefor.

One object of the invention is to provide the tape with feet denoting numerals at each of the inch graduations or marks, so that the measurement may be quickly read without looking back to the last preceding foot-mark.

Another object of the invention is to provide a device of this character in which the casing for the tape and its winding-drum form a part of the measuring mechanism, so that the device may be used in corners and other places where inside measurement is desired.

With the above and other objects in view the invention consists of certain novel features of construction, combination, and arrangement of parts, as will be hereinafter described and claimed.

In the accompanying drawings, Figure 1 is a perspective view of a measuring-tape and its casing constructed in accordance with my invention. Fig. 2 is a side elevation of the same, and Fig. 3 is a transverse sectional view.

Referring to the drawings by numeral, 1 denotes a flexible measuring-tape which may be constructed of fabric, metal, or any other suitable material and which has attached to one of its ends the usual loop or eye 2 and its other end secured to and wound upon a drum 3, which is journaled within a casing 4. The shaft of the drum 3 is provided upon one side of the casing 4 with a folding crank-handle 5, which consists of two members 6 and 7, hingedly connected, as shown at 8. The member 6 is formed with a socket 9 to receive the handle 10, which is provided upon the other section 7 and which is adapted to be frictionally retained in said socket by a spring 11, located in said socket, as clearly shown in Fig. 3 of the drawings.

The tape may be marked with graduations of any desired scale; but, as illustrated in the drawings, it is graduated in feet and inches, and the inches are divided into quarters. In order to facilitate the reading of the tape and prevent the necessity of looking back to the last preceding foot-mark to determine the distance from the free end of the tape to any particular inch-mark, I provide at each of the inch-marks a numeral to indicate the number of feet, as will be readily seen upon reference to Fig. 1 of the drawings. The provision of the feet denoting numerals at each of the inch graduations or marks will greatly facilitate the reading of the tape, as will be readily understood.

The casing 4 is substantially rectangular in form and has two of its sides 12 13 disposed in planes at right angles to each other. In the side 12 is formed an opening 14, through which the tape 1 passes, and in the side 13 is formed a recess 15, with which the fingers are engaged in holding the casing, as will be presently explained. The tape 1 also passes through a combined guide and indicator 16, which is in the form of a loop or bail, provided upon the side 12 of the casing adjacent to the opening 14. The measurements are read from this indicator 16 and include the distance from the free end of the tape to the square end 17 of the casing, which is formed by the right-angularly-disposed sides 12 13, the disposition of the graduations upon the tape being such that the distance between the indicator 16 and the corner 17 is compensated for by shortening the free end of the tape, as will be readily seen upon reference to Fig. 1. By having the graduations of the tape begin not at the one-inch mark, as is ordinarily the case, but at a point corresponding to the distance between the indicator 16 and the corner or end 17, it will be seen that the casing forms a part of the measuring tape or mechanism when the device is used and that measurements may be conveniently made in corners or other close places where it is impossible to extend the tape beyond the point measured or to bend the tape to such point. This feature is especially desirable when the tape is made of steel or other metal, since it is difficult to bend the tape to make accurate inside measurements.

The construction, use, and advantages of the invention will be readily understood from the foregoing description, taken in connection with the accompanying drawings.

It will be seen that in taking measurements the tape is held with the thumb at the end opposite the recess 15, the fourth finger at the opening 14 to serve as a brake to the unreeling of the tape when approaching the point of measurement and the remaining fingers in the recess 15.

Various changes in the form, proportion, and the minor details of construction may be resorted to without departing from the principle or sacrificing any of the advantages of this invention.

Having thus described my invention, what I claim as new, and desire to secure by Letters Patent, is—

A device of the character described, comprising a casing having two of its sides disposed in planes at right angles to each other, one of said sides being formed with an opening and the other with a finger-recess, a winding-drum in said casing, a measuring-tape wound upon said drum and passing through said opening, a combined tape-guide and indicator upon said casing, and graduations upon said tape so disposed that the measurement read at said indicator will include the distance from the outer end of said tape to the square end of said casing, substantially as described.

In testimony whereof I have hereunto set my hand in presence of two subscribing witnesses.

EDMUND L. SAXTON.

Witnesses:
MARY F. SAXTON,
GEO. H. SAXTON.